US006985590B2

(12) United States Patent
Tachibana et al.

(10) Patent No.: US 6,985,590 B2
(45) Date of Patent: Jan. 10, 2006

(54) ELECTRONIC WATERMARKING METHOD AND APPARATUS FOR COMPRESSED AUDIO DATA, AND SYSTEM THEREFOR

(75) Inventors: Ryuki Tachibana, Yamato (JP); Shuhichi Shimizu, Yokohama (JP); Seiji Kobayashi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 955 days.

(21) Appl. No.: 09/741,715

(22) Filed: Dec. 20, 2000

(65) Prior Publication Data

US 2002/0006203 A1 Jan. 17, 2002

(30) Foreign Application Priority Data

Dec. 22, 1999 (JP) ................................ 11-364627

(51) Int. Cl.
*H04L 9/00* (2006.01)
*H04K 1/00* (2006.01)

(52) U.S. Cl. ....................... 380/269; 380/236; 382/250

(58) Field of Classification Search ................ 380/217, 380/236–238, 253, 200, 210, 216, 252, 255, 380/269; 382/232, 248, 250; 713/150, 168, 713/176

See application file for complete search history.

(56) References Cited

U.S. PATENT DOCUMENTS

| | | | | |
|---|---|---|---|---|
| 5,731,767 | A * | 3/1998 | Tsutsui et al. | 341/50 |
| 5,752,224 | A * | 5/1998 | Tsutsui et al. | 704/225 |
| 5,825,320 | A * | 10/1998 | Miyamori et al. | 341/139 |
| 5,960,390 | A * | 9/1999 | Ueno et al. | 704/200.1 |
| 6,366,888 | B1 * | 4/2002 | Kroon et al. | 704/500 |
| 6,370,502 | B1 * | 4/2002 | Wu et al. | 704/230 |
| 6,425,082 | B1 * | 7/2002 | Matsui et al. | 713/176 |
| 6,430,401 | B1 * | 8/2002 | Lou et al. | 455/108 |
| 6,434,253 | B1 * | 8/2002 | Hayashi et al. | 382/100 |
| 6,453,053 | B1 * | 9/2002 | Wakasu | 382/100 |
| 6,539,357 | B1 * | 3/2003 | Sinha | 704/270.1 |
| 6,694,040 | B2 * | 2/2004 | Hayashi et al. | 382/100 |
| 6,704,705 | B1 * | 3/2004 | Kabal et al. | 704/230 |
| 6,735,325 | B2 * | 5/2004 | Wakasu | 382/100 |
| 2002/0110260 | A1 * | 8/2002 | Wakasu | 382/100 |
| 2005/0060146 | A1 * | 3/2005 | Oh | 704/229 |

FOREIGN PATENT DOCUMENTS

| | | |
|---|---|---|
| JP | PUPA 11-212463 | 8/1999 |
| JP | PUPA 11-284516 | 10/1999 |
| JP | PUPA 11-316599 | 11/1999 |

* cited by examiner

*Primary Examiner*—Christopher Revak

(57) ABSTRACT

The present invention provides a method and a system with which information embedded in compressed digital audio data can be directly operated. An embodiment of the system for embedding additional information in compressed audio data includes: means for extracting MDCT (Modified Discrete Cosine Transform) coefficients from the compressed audio data; means for employing the MDCT coefficients to calculate a frequency component for the compressed audio data; means for embedding additional information in the frequency component obtained in a frequency domain; means for transforming into MDCT coefficients the frequency component in which the additional information is embedded; and means for using the MDCT coefficients, in which the additional information is embedded, to generate compressed audio data.

17 Claims, 8 Drawing Sheets

ELECTRONIC WATERMARKING METHOD AND APPARATUS FOR COMPRESSED AUDIO DATA, AND SYSTEM THEREFOR

FIELD OF THE INVENTION

The present invention relates to a method and a system for embedding, detecting and updating additional information, such as copyright information, relative to compressed digital audio data, and relates in particular to a technique whereby an operation equivalent to an electronic watermarking technique performed in a frequency domain can be applied for compressed audio data.

BACKGROUND ART

As a technique for the electronic watermarking of audio data, there is a Spread Spectrum method, a method for employing a polyphase filter, or a method for transforming data in a frequency domain and for embedding the resultant data. The method for embedding and detecting information in the frequency domain has merit in that an auditory psychological model can be easily employed, in that high tone quality can be easily provided and in that the resistance to transformation and noise is high. However, the target for the conventional audio electronic watermarking technique is limited to digital audio data that is not compressed. For the Internet distribution of audio data, generally the audio data are compressed, because of the limitation imposed by the communication capacity, and the compressed data are transmitted to users. Thus, when the conventional electronic watermarking technique is employed, it is necessary for the compressed audio data be decompressed, for the obtained data to be embedded and for the resultant data to be compressed again. The calculation time required for this series of operations is extended for the advanced audio compression technique that implements both high tone quality and high compression efficiency. How long it takes before a user can listen to audio data greatly effects the purchase intent of a user. Therefore, there is a demand for a process whereby the embedding, changing or updating of additional information can be performed while the audio data are compressed. However, there is presently no known method available for embedding additional information directly into compressed digital audio data, and for changing or detecting the additional information.

SUMMARY OF THE INVENTION

To resolve the above shortcoming, it is one object of the present invention to provide a method and a system with which information embedded in compressed digital audio data can be directly operated.

It is one more object of the present invention to provide a method and a system with which additional information can be embedded in compressed digital audio data.

It is another object of the present invention to provide a method and a system for which only a small memory capacity is required in order to embed additional information in digital audio data.

It is an additional object of the present invention to provide a method and a system with which minimized additional information can be embedded in digital audio data.

It is a further object of the present invention to provide a method and a system with which additional information embedded in compressed digital audio data can be detected without the decompression of the audio data being required.

It is yet one more object of the present invention to provide a method and a system with which additional information embedded in compressed digital audio data can be changed without the decompression of the audio data being required.

BRIEF DESCRIPTION OF THE DRAWINGS

These and other aspects, features, and advantages of the present invention will become apparent upon further consideration of the following detailed description of the invention when read in conjunction with the following drawing.

DESCRIPTION OF THE SYMBOLS

Figure 1:
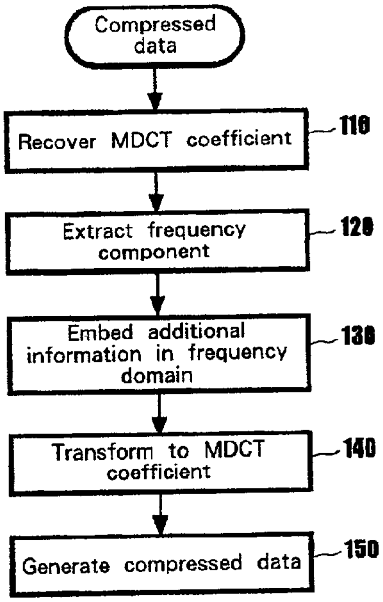
FIG. 1 is a block diagram illustrating an apparatus for embedding additional information directly in compressed audio data.

1: CPU
2: Bus
4: Main memory
5: Keyboard/mouse controller
6: Keyboard
7: Pointing device
8: Display adaptor card
9: Video memory
10: DAC/LCDC
11: Display device
12: CRT display
13: Hard disk drive
14: ROM
15: Serial port
16: Parallel port
17: Timer
18: Communication adaptor
19: Floppy disk controller
20: Floppy disk drive
21: Audio controller
22: Amplifier
23: Loudspeaker
24: Microphone
25: IDE controller
26: CD-ROM

27: SCSI controller
28: MO
29: CD-ROM
30: Hard disk drive
31: DVD
32: DVD
100: System

DETAILED DESCRIPTION OF THE INVENTION

Additional Information Embedding System

To achieve the above objects, according to the present invention, a system for embedding additional information in compressed audio data comprises:

(1) means for extracting MDCT (Modified Discrete Cosine Transform) coefficients from the compressed audio data;

(2) means for employing the MDCT coefficients to calculate a frequency component for the compressed audio data;

(3) means for embedding additional information in the frequency component obtained in a frequency domain;

(4) means for transforming into MDCT coefficients the frequency component in which the additional information is embedded; and (5) means for using the MDCT coefficients, in which the additional information is embedded, to generate compressed audio data.

Additional Information Updating System

Further, according to the present invention, a system for updating additional information embedded in compressed audio data comprises:

(1) means for extracting MDCT coefficients from the compressed audio data;

(2) means for employing the MDCT coefficients to calculate a frequency component for the compressed audio data;

(3) means for detecting the additional information in the frequency component that is obtained;

(3-1) means for changing, as needed, the additional information for the frequency component;

(4) means for transforming into MDCT coefficients the frequency component in which the additional information is embedded; and (5) means for using the MDCT coefficients, in which the additional information is embedded, to generate compressed audio data.

Additional Information Detection System

Further, according to the present invention, a system for detecting additional information embedded in compressed audio data comprises:

(1) means for extracting MDCT coefficients from the compressed audio data;

(2) means for employing the MDCT coefficients to calculate a frequency component for the compressed audio data; and (3) means for detecting the additional information in the frequency component that is obtained.

It is preferable that the means (2) calculate the frequency component for the compressed audio data using a precomputed table in which a correlation between MDCT coefficients and frequency components is included.

It is also preferable that the means (4) transforms the frequency component into the MDCT coefficients by using a precomputed table that includes a correlation between MDCT coefficients and frequency components.

In addition, it is preferable that the means (3) for embedding the additional information in the frequency domain divide an area for embedding one bit by the time domain, and calculate a signal level for each of the individual obtained area segments, while embedding the additional information in the frequency domains in accordance with the lowest signal level available for each frequency.

Correlation Table Generation Method

According to the present invention, for at least one window function and one window length employed for compressing audio data, a method for generating a table including a correlation between MDCT coefficients and frequency components comprises:

(1) a step of generating a basis which is used for performing a Fourier transform for a waveform along a time axis;

(2) a step of multiplying a window function by a corresponding waveform that is generated by using the basis;

(3) a step of performing an MDCT process, for the result obtained by the multiplication of the window function, and of calculating an MDCT coefficient; and (4) a step of correlating the basis and the MDCT coefficient. The example basis can be a sine wave and a cosine wave.

Operation of Additional Information Embedding System

The system for embedding additional information in compressed audio data, first extracts compressed MDCT coefficients from compressed digital audio data. Then, the system employs MDCT coefficients sequence that have been calculated and stored in a table in advance to obtain the frequency component of the audio data. Thereafter, the system employs the method for embedding additional information in a frequency domain to calculate an embedded frequency signal, and subsequently, the system employs the table to transform the embedded frequency signal into a MDCT coefficient, and adds the obtained MDCT coefficient to the MDCT coefficient of the audio data. The resultant MDCT coefficients are defined as new MDCT coefficients for the audio data, and are again compressed; the resultant data being regarded as watermarked digital audio data.

According to the method of the invention for embedding the minimum data, a frame for the embedding therein of one bit is divided at a time domain, a signal level is calculated for each of the frame segments, and the upper embedding limit is obtained in accordance with the lowest signal level available for each frequency.

Operation Performed for Correlation Table

A table for correlating the MDCT coefficient and the frequency component is obtained in which representation of each basis of a Fourier transformation relative to the MDCT coefficient is calculated in advance in accordance with a frame length (a window function and a window length). Thus, an operation on the compressed audio data can be performed directly.

The means for reducing the memory size that is required for the correlation table employs the periodicity of the basis, such as a sine wave or a cosine wave, to prevent the storage of redundant information. Or, instead of storing in the table the MDCT results obtained for the individual bases using the Fourier transformation, each basis is divided into several segments, and corresponding MDCT coefficients are stored so that the memory size required for the table can be reduced.

Operation of Additional Information Detection System

The system of the invention employed detecting additional information in compressed audio data, recovers coded MDCT coefficients and employs the same table as is used for the embedding system to perform a process equivalent to the detection in the frequency domain and the detection of bit information and a code signal.

Operation of Additional Information Updating System

The system of the invention, used for updating additional information embedded in compressed audio data, recovers the coded MDCT coefficients and employs the same method as the detection system to detect a signal embedded in the MDCT coefficients. Only when the strength of the embedded signal is insufficient, or when a signal that differs from a signal to be embedded is detected and updating is required, the same method is employed as that used by the embedding system to embed additional information in the MDCT coefficients. The newly obtained MDCT coefficients are thereafter recorded so that they can be employed as updated digital audio data.

Preferred Embodiment

First, definitions of terms will be given before the preferred embodiment of the invention is explained.

Sound Compression Technique

Compressed data for the present invention are electronic compressed data for common sounds, such as voices, music and sound effects. The sound compression technique is well known as MPEG1 or MPEG2. In the specification, this compression technique is generally called the sound compression technique, and the common sounds are described as sound or audio.

Compressed State

The compressed state is the state wherein the amount of audio data is reduced by the target sound compression technique, while deterioration of the sound is minimized.

Non-Compressed State

The non-compressed state is a state wherein an audio waveform, such as a WAVE file or an AIFF file, is described without being processed.

Decode the Compressed State

This means "convert from the compressed state of the audio data to the non-compressed state." This definition is also applied to "shifting to the non-compressed state."

MDCT Transform (Modified Discrete Cosine Transform)

Equation 1

[All the equations are tabulated at the end of the text of this description, just before the claims.]

Xn denotes a sample value along the time axis, and n is an index along the time axis.

Mk denotes a MDCT coefficient, and k is an integer of from 0 to (N/2)−1, and denotes an index indicating a frequency.

In the MDCT transform, the sequence X0 to X(N−1) along the time axis are transformed into the sequence M0 to M((N/2)−1) along the frequency axis. While the MDCT coefficient represents one type of frequency component, in this specification, the "frequency component" means a coefficient that is obtained as a result of the DFT transform.

DFT Transform (Discrete Fourier Transform)

Equation 2

Xn denotes a sample value along the time axis, and n denotes an index along the time axis.

Rk denotes a real number component (cosine wave component); Ik denotes an imaginary number component (sine wave component); and k is an integer of from 0 to (N/2)−1, and denotes an index indicating a frequency. The discrete fourier transform is a transformation of the sequence X0 to X(N−1) along the time axis into the sequences R0 to R((N/2)−1), and I0 to I((N/2)−1) along the frequency axis. In this specification, "frequency component" is the general term for the sequences Rk and Ik.

Window Function

This function is to be multiplied by the sample value before the MDCT is performed. Generally, the sine function or the Kaiser function is employed.

Window Length

The window length is a value that represents the shape or length of a window function to be multiplied with data in accordance with the characteristic of the audio data, and that indicates whether the MDCT should be performed for several samples.

FIG. 1 is a block diagram showing the processing performed by an apparatus for directly embedding additional information in compressed audio data. A block 110 is a block for extracting MDCT coefficients sequence from compressed audio data that are entered. A block 120 is a block for employing the extracted MDCT coefficients to calculate the frequency component of the audio data. A block 130 is a block for embedding additional information in the obtained frequency component of a frequency domain. A block 140 is a block for transforming the frequency component using the additional information embedded in an MDCT coefficient. And finally, a block 150 is a block for generating compressed audio data by using the MDCT coefficient obtained by the block 140.

The blocks 120 and 130 employ a correlation table for the MDCT coefficient and the frequency to perform a fast transform. In this invention, the representations of the bases of the Fourier transform in the MDCT domain are entered in advance in the table, and are employed for the individual embedding, detection and updating systems. An explanation will now be given for the correlation table for the MDCT coefficient and the frequency and the generation method therefor, the systems used for embedding, detecting and updating compressed audio data, and other associated methods.

Correlation Table for MDCT Coefficients and Frequency Components

Audio data must be transformed into a frequency domain in order to employ an auditory psychological model for embedding calculation. However, a very extended calculation time is required to perform inverse transformations, for the audio data that are represented as MDCT coefficients, and to perform the Fourier transforms for audio data at the time domain. Thus, a correlation between the MDCT coefficients and the frequency components is required.

If the audio data are compressed by performing the MDCT for a constant number of samples without a window function, the MDCT employs the cosine wave with a shifted phase as a basis. Therefore, the difference from a Fourier transform consists only of the shifting of a phase, and a preferable correlation can be expected between the MDCT domain and the frequency domain. However, to obtain improved tone quality, the latest compression technique changes the shape or the length of the window function to be multiplied (hereinafter refereed to as a window length) in accordance with the characteristic of the audio data. Thus, a simple correlation between a specific frequency for the MDCT and a specific frequency for a Fourier transform can not be obtained, and since the correlation can not be acquired through calculation, it must be stored in a table.

Figure 2:
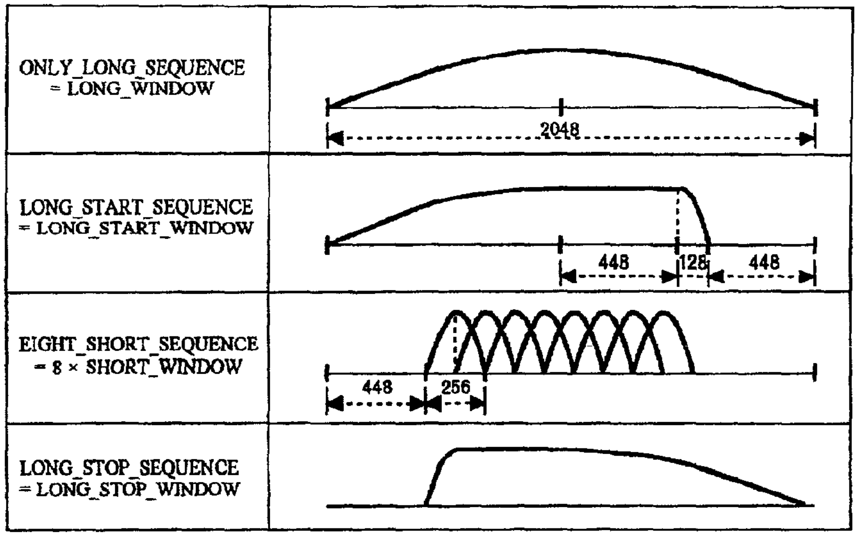
FIG. 2 is a diagram showing an example for a window length and a window function.

FIG. 2 is a diagram showing window length and window function examples. While this invention can be applied for various compressed data standards, in this embodiment, the MPEG2 standards are employed. For MPEG2 AAC (Advanced Audio Coding), for example, a window function normally having a window length of 2048 samples is multiplied to perform the MDCT. For a portion where sound is drastically altered, a window function having a window length of 256 samples is multiplied to perform the MDCT, so that a type of deterioration called pre-echo is prevented. A normal frame for which 2048 samples is a unit is called an ONLY_LONG_SEQUENCE, and is written using 1024 MDCT coefficients that are obtained from one MDCT process. A frame for which 256 samples is a unit is called an EIGHT_SHORT_SEQUENCE, and is written using eight pairs of MDCT 128 coefficients that are obtained by repeating the MDCT eight times, for 256 samples each time, with each frame half overlapping its adjacent frame. Further, asymmetric window functions called a LONG_START_SEQUENCE and a LONG_STOP_SEQUENCE are also employed to connect the above frames.

Figure 3:
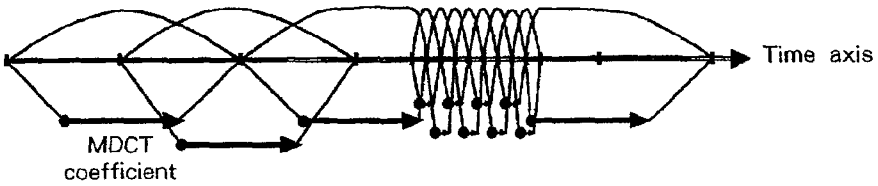
FIG. 3 is a diagram showing the relationship existing between a window function and MDCT coefficients.

FIG. 3 is a diagram showing the correlation between the window functions and the MDCT coefficients sequence. For the MPEG2 AAC, the window functions are multiplied by the audio data along the time axis, for example, in the order indicated by the curves in FIG. 3, and the MDCT coefficients are written in the order indicated by the thick arrows. When the window length is varied, as in this example, the bases of a Fourier transform can not simply be transformed into a number of MDCT coefficients.

Therefore, to embed additional information, the correlation table of this invention does not depend on the window function (a signal added during the additional information embedding process should not depend on a window function when the signal is decompressed and developed along the time axis). Therefore, when an embedding method is employed that depends on the shape of the window function and the window length, the embedding and the detection of the compressed audio data can be performed, and the window function that is used can be identified when the data are decompressed.

The correlation table of the invention is generated so that frames in which additional information is to be embedded do not interfere with each other. That is, in order to embed additional information, the MDCT window must be employed as a unit, and when the data are developed along the time axis, one bit must be embedded in a specific number of samples, which together constitute one frame. Since for the MDCT, target frames for the multiplication of a window overlap each other 50%, a window that extends over a plurality of frames is always present (a block 3 in FIG. 4 corresponds to such a window). When additional information is simply embedded in one of these frames, it affects the other frames. And when data embedding is not performed, the data embedding intensity is reduced, as is detection efficiency. Signals indicating different types of additional information are embedded in the first and the second halves of a frame.

The correlation table is employed when a frequency component is to be calculated using the MDCT coefficient to embed additional information, when an embedded signal obtained at the frequency domain is to be again transformed into an MDCT coefficient, and when a calculation corresponding to a detection in a frequency domain is to be performed in the MDCT domain. Since the detection and the embedding of a signal are performed in order during the updating process, all the transforms described above are employed in the updating process.

Method for Generating a Correlation Table when the Length of a Window Function is Unchanged First, an explanation will be given for the table generation method when a window length is constant, and for the detection and embedding methods that use the table. These methods will be extended later for use by a plurality of window lengths. Assume that the window function is multiplied along the time axis by audio data consisting of N samples and the MDCT is performed to obtain N/2 MDCT coefficients, and that N/2 MDCT coefficients are employed and written as one block (i.e., a constant window length is defined as N samples). Hereinafter, if not specifically noted, the term "block" represents N/2 MDCT coefficients. The audio data along the time axis that correspond to two sequential blocks are those where there is a 50%, i.e., N/2 samples, overlap.

Figure 4:
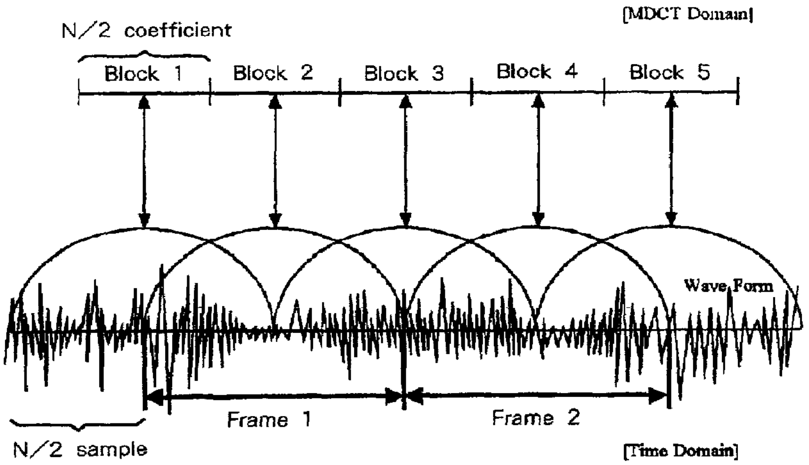
FIG. 4 is a block diagram of an MDCT domain that corresponds to a frame along a time axis.

The target of the present invention is limited to an embedding ratio for the embedding of one bit in relative samples integer times N/2. In this embodiment, the number of samples required along the time axis to embed one bit is defined as n×N/2, which is called one frame. Due to the previously mentioned 50% overlapped property there is also a block that is extended across two sequential frames along the time axis. FIG. 4 is a specific diagram showing two frames extended along the time axis when n=2 that correspond to five blocks in the MDCT domain. The audio data along the time axis are shown in the lower portion in FIG. 4, the MDCT coefficients sequence are shown in the upper portion, and elliptical arcs represent the MDCT targets. Block 3 is a block extending half way across Frame 1 and Frame 2.

Figure 5:
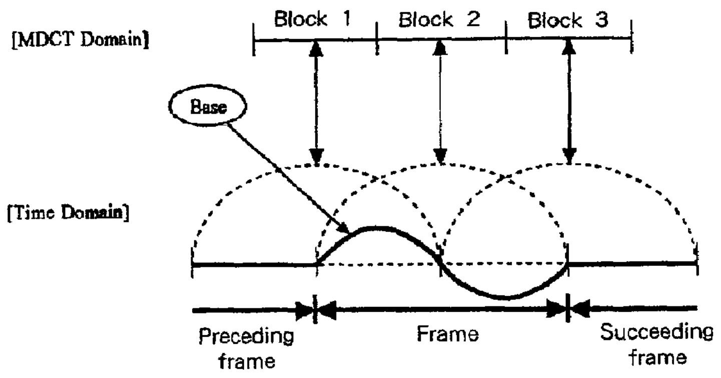
FIG. 5 is a specific diagram showing a sine wave.

Since the embedding operation is performed for the independent frames, the correlation between the frequency component and the MDCT coefficient for each frame need only be required for the table. In other words, adjacent frames in which embedding is performed should not affect each other. Therefore, for each basis of a Fourier transform having a cycle of N/(2×m), the MDCT coefficients sequence obtained using the following methods are employed to prepare a table. In this case, m is an integer equal to or smaller than N/2. FIG. 5 is a diagram showing a sine wave for n=2 and m=1.

There are n+1 blocks present that are associated with one frame, and the first and the last blocks also extend into the respective succeeding and preceding frames (blocks 1 and 3 in FIG. 5). Thus, assume a waveform (the thick line portion in FIG. 5) is obtained by connecting N/2 samples having a value of 0 before and after the basis waveform that has an amplitude of 1.0 and a length equivalent to one frame. When a window function (corresponding to an elliptical arc in FIG. 5) is multiplied by N samples, while 50% of the first part of the waveform is overlapped, and the MDCT is performed, this waveform can be represented by using the MDCT coefficients. If the IMDCT is performed for the obtained MDCT coefficients sequence, the preceding and succeeding N/2 samples have a value of 0.

Figure 6:
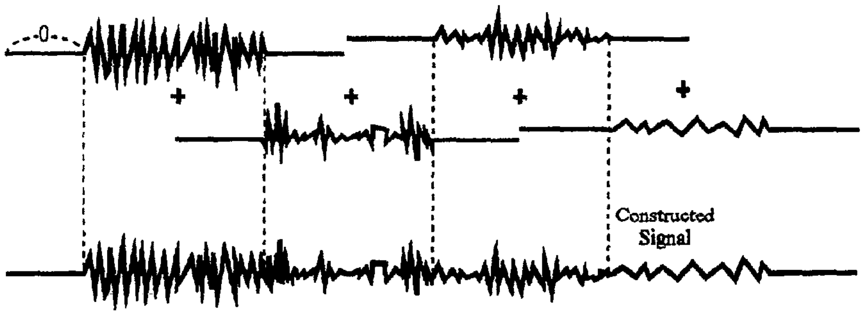
FIG. 6 is a diagram showing an example for embedding additional information in an adjacent frame.

FIG. 6 is a diagram showing an example wherein additional information is embedded in adjacent frames. When samples having a value of 0 are added as shown in FIG. 6, the interference produced by embedding performed in adjacent frames can be prevented. In the data detection process and the frequency component calculation process, detection results and frequency components can be obtained that are designated for a pertinent frame and that are not affected by preceding and succeeding frames. If a value of 0 is not compensated for, adjacent frames affect each other in the embedding and detection process.

The processing performed to prepare the table is as follows.

Step 1: First, calculations are performed for a cosine wave having a cycle of N/2×n/k, an amplitude of 1.0 and a length of N/2×n. This cosine wave corresponds to the k-th basis when a Fourier transform is to be performed for the N/2×n samples.

$$f(x)=\cos(2\pi/(N/2\times n/k)\times x)=\cos(4k\pi/(N\times n)\times x)\ (0\leq x<N/2\times n)$$

Step 2: N/2 samples having a value of 0 are compensated for at the first and the last of the waveform (FIG. 5).

$$g(y)=0\ (0\leq y<N/2)$$

$$f(y-N/2)\ (N/2\leq y<N/2\times(n+1))$$

$$0\ (N/2\times(n+1)\leq y<N/2\times(n+2))$$

Step 3: The samples N/2×(b−1)th to N/2×(b+1)th are extracted. Here b is an integer of from 1 to n+1, and for all of these integers the following process is performed.

$$h_b(z)=g(z+N/2\times(b-1))\ (0\leq z<N)$$

Step 4: The results are multiplied by a window function.

$$h_b(z)=h_b(z)\times\text{win}(z)\ (0\leq z<N,\ \text{win}(z)\text{ is a window function})$$

Step 5: The MDCT process is performed, and the obtained N/2 MDCT coefficients are defined as vectors $V_{r,b,k}$.

$$V_{r,b,k}=MDCT(h_b(z))$$

Since the MDCT transform is an orthogonal transform and each basis of a Fourier transform is a linear independence, $V_{r,b,k}$ are orthogonal for a k having a value of 1 to N/2.

Step 6: $V_{r,b,k}$ is obtained for all the combinations (k, b), and each matrix $T_{r,b}$ is formed.

$$T_{r,b}=(V_{r,b,1},\ V_{r,b,2},\ V_{r,b,3},\ \ldots\ V_{r,b,N/2})$$

The vector that is obtained for a sine wave using the same method is defined as vi,b,k, and the matrix is defined as Ti, b. Each sequence is an MDCT coefficient sequence that represents the sine wave of a value of 1. Since there are 1 to n+1 blocks, 2×(n+1) matrixes are obtained.

Transform from a Frequency Domain into an MDCT Domain

Assume that the audio data in the frequency domain are represented as R+jI, where j denotes an imaginary number element, R denotes a real number element and I is the N/2th order real number vector that represents an imaginary number element. The k element corresponds to a basis having a cycle of (N/2)×n/k samples. The MDCT coefficient sequence Mb is obtained as the sum of the vectors of MDCT coefficients sequence, which is obtained by transforming each frequency component separately into an MDCT domain, and can be represented as $M_b=T_{r,b}+T_{i,b}I$. In this case, b is an integer of from 1 to n+1, and corresponds to each block. M1 and Mn+1 are MDCT coefficients sequence for a block that extends across portions of adjacent frame.

Transform from an MDCT Domain into a Frequency Domain

Here, vi,b,k and the vr,b,k are orthogonal to each other and form an MDCT domain. Thus, when a specific MDCT coefficient sequence is given, and when the inner product is calculated for the MDCT coefficient sequence and vr,b,k or vi,b,k, the element in the corresponding direction of the Mb can be obtained that represents respectively a real number element and/or an imaginary number element in the frequency domain. The MDCT coefficients sequence for (n+1) blocks associated with one frame are collectively processed to obtain the frequency component for the pertinent frame.

Equation 3

Correlation Table Generation Method when a Window Function is Changed in Audio Data Assume that the types of window functions that could be employed for compression are listed. All the window lengths are dividers having a maximum window length of N. For a block having an N/W (W is an integer) sample window length, assume that the MDCT is repeated for the N/W sample W times, with 50% overlapping, and that as a result W pairs of N/(2W) MDCT coefficients, i.e., a total of N/2 coefficients, are written in the block. Further, assume that in the first MDCT process N/W samples beginning with the "offset" sample in the block are transformed. For example, where for the EIGHT_SHORT_SEQUENCE of the MPEG2 AAC, N=2048, W=8 and offset=448. As a result of repeating the eight MDCT processes for 256 samples with 50% overlapping, eight pairs of 128 MDCT coefficients are written along the time axis (see FIGS. 2 and 3).

Table Generation Method

The table for the window length N/W is generated as follows.

Step 1: The same as when the length of the window function is unchanged.

Step 2: The same as when the length of the window function is unchanged.

Step 3: The N/W sample corresponding to the W-th window is extracted. W is an integer of from 1 to W. b is an integer of from 1 to n+1. The following processing must be performed for all the combinations of b and w.

$$h_{b,w}(z)=g(z+N/2\times(b-1)+N/2/W\times w+\text{offset})\ (0\leq z<N/W)$$

Step 4: The results are multiplied by a window function.

$$h_{b,w}(z)=h_{b,w}(z)\times\text{win}(z)\ (0\leq z<N/W:\ \text{win}(z)\text{ is a window function})$$

Step 5: The MDCT process is performed, and the obtained N/(2 W) MDCT coefficients are defined as vectors $v_{r,b,k,w}$.

$$v_{r,b,k,w}=MDCT\ (h_{b,w}(z))$$

Step 6: $v_{r,b,k,w}$ are arranged to define $v_{r,b,k}$.

When $v_{r,b,k,w}$ is obtained for all the "w"s having a value of 1 to W, they are arranged vertically to obtain vector $v_{r,b,k}$.

Figure 7:
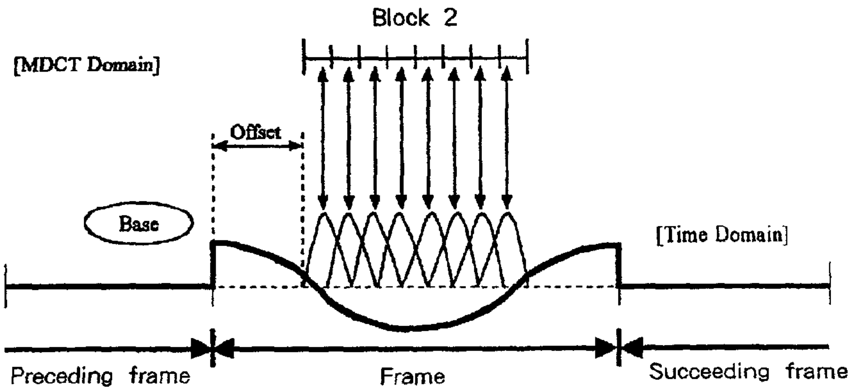
FIG. 7 is a diagram showing a portion of a basis for which the MDCT has been performed.

FIG. 7 is a diagram showing the portion of a basis for which, with n=2, b=2, k=1 and W=8, the MDCT process has been performed to obtain the coefficients $v_{r,2,1,w}$.

Step 7: The coefficients $v_{r,b,k}$ are obtained for all the combinations (k, b), and the coefficients $v_{r,b,k}$ for k having values of 1 to N/2 are arranged horizontally to constitute $T_{W,r,b}$.

Since each $v_{r,b,k,w}$ is a vector of N/(2 w) rows by one column, this matrix is a square matrix of N/2 rows by N/2 columns. Each column illustrates how a cosine wave having a value of 1 is represented as the MDCT coefficients sequence in the b-th block having a window length of N/W. Similarly, the matrix TW,i,b is obtained in the sine wave. Since from 1 to n+1 block numbers b are provided, for this window length, 2×(n+1) matrixes are obtained. In addition, the table is prepared in accordance with the window length and the types of window functions.

Transform from the Frequency Domain to the MDCT Domain

The difference from a case where only one type of window length is employed is that block information is read from compressed audio data and that a different matrix is employed in accordance with the window function that is used for each block. Since the matrix is varied for each block, the MDCT coefficient sequence Mb is adjusted in order to cope with the window function and the window length that are employed. The waveform, which is obtained when the IMDCT is performed for the MDCT coefficient sequence Mb in the time domain, and the frequency component, which is obtained by performing a Fourier transform in the frequency domain, do not depend on the window function and the window length. The MDCT coefficient sequence Mb is obtained using Mb= $T_{w,r,b}R+T_{w,1,b}I$.

Transform from the MDCT Domain to the Frequency Domain

When $T_{w,r,b}$ is employed instead of $T_{r,b}$, the transform in the frequency domain can be performed in the same manner. When the matrix is changed in accordance with the window function and the window length, a true frequency component can be obtained that does not depend on the window function and the window length.

Equation 4

Method for Reducing a Memory Capacity Required for the Table

Since the matrix has a size of (N/2)×(N/2), the table generated by this method is constituted by 2×(n+1)×(N/2)×(N/2)=(n+1)×N/2/2 MDCT coefficients (floating-point numbers). However, since the contents of this table tend to be redundant, the memory capacity that is actually required can be considerably reduced.

Method 1: Method for Using the Periodicity of the Basis

The periodicity of the basis can be employed as one method. According to this method, since several $V_{r,b,k}$ are identical, this portion is removed.

When m is an integer, the cosine wave that is N/2×m samples ahead is represented as $$f(x+N/2\times m)=\cos(4k\pi/(N\times n)\times(x+N/2\times m))=\cos(4k\pi/(N\times n)\times x+4k\pi/(N\times n)\times N/2\times m)=\cos(4k\pi/(N\times n)\times x+2\pi k\times m/n).$$

Therefore, in case a where (k×m)/n is an integer, $$f(x+N/2\times m)=f(x) \text{ (limited to a range } 0\leqq x\leqq N/2\times(n-m))$$

$$g(y+N/2\times m)=g(y) \text{ (limited to a range } N/2\leqq y\leqq N/2\times(n-m+1)).$$

Thus, $$h_{b+m}(z)=h_b(z) \text{ (limited to a range } 2\leqq b\leqq n-m),$$

and $$V_{r,b+m,k}=V_{r,b,k} \text{ (limited to a range } 2\leqq b\leqq n-m)$$

is obtained. The range is limited because of the range defined for f(x).

In case b where (k×m)/n is an irreducible fraction that can be represented by integer/2, $$f(x+N/2\times m)=-f(x)$$

And $$h_{b+m}(z)=-h_b(z).$$

Thus, $$V_{r,b+m,k}=-V_{r,b,k}.$$

The range limitation is the same as it is for case a.

In case c where (k×m)/n is an irreducible fraction that can be represented by (4×integer+1)/4, $$f(x+N/2\times m)=\cos(4k\pi/(N\times n)\times x+\pi(\text{even number}+1/2))=-\sin(4k\pi/(N\times n)\times x).$$

Thus, $$V_{r,b+m,k}=-V_{l,b,k}.$$

In case d where (k×m)/n is an irreducible fraction that can be represented by (4×integer+3)/4, $$f(x+N/2\times m)=\cos(4k\pi/(N\times n)\times x+\pi(\text{odd number}+1/2))=\sin(4k\pi/(N\times n)\times x).$$

Thus, $$V_{r,b+m,k}=V_{i,b,k}.$$

The range limitation is the same as it is for case a.

Therefore, $V_{r,b+m,k}$, which establishes conditions a to d, can be replaced by another vector, and this is applied to $V_{i,b\ k}$. Thus, instead of storing the matrixes $T_{r,b}$ and $T_{l,b}$ being unchanged, only the following minimum elements need be stored. The following minimum elements are as follows.

vectors $V_{r,b,k}$ and $V_{l,b,k}$ that do not establish the conditions a to d information concerning the positive or negative sign that is to be added to a vector that is to be used for each column in the matrixes $T_{r,b}$ and $T_{i,b}$.

For the actual transform between the MDCT domain and the frequency domain, the vectors $V_{r,b,k}$ and $V_{i,b,k}$ are employed instead of the columns in the matrixes $T_{r,b}$ and $T_{i,b}$ to perform a calculation equivalent to the matrix operation. The transform from the frequency domain to the MDCT domain is represented as follows.

Equation 5

Another appropriate vector is employed for a portion wherein a vector is standardized. The transform from the MDCT domain to the frequency domain is performed by obtaining the following inner product for each frequency component. The following equation is obtained by separating the equation used for the matrixes $T_{r,b}$ and $T_{l,b}$ into its individual components.

Equation 6

Due to the vector standardization, the required memory capacity depends on "n" to a degree. For example, since only the condition a is established when n=3, the required memory capacity is reduced only 8.3%, while when n=4, it is reduced 40%.

Since the same relation exists between hb and w as when only one type of window function is provided in a case where the window function is varied, the above standardization can be employed unchanged, and when the same condition is established, the following equation is obtained.

Equation 7

Figure 8:
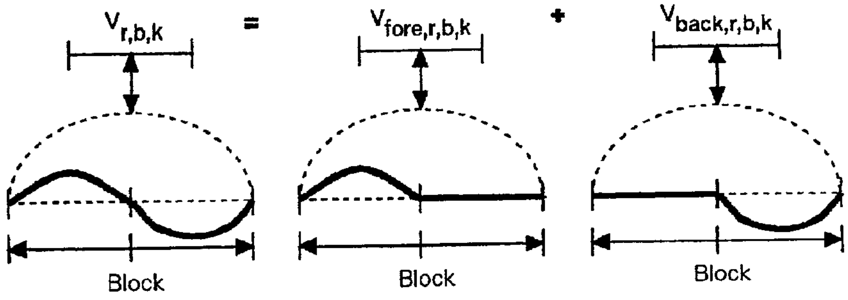
FIG. 8 is a diagram showing an example of the separation of a basis.

Method 2: Method for Separating the Basis into Preceding and Succeeding Segments Furthermore, the linearity of the MDCT is employed to separate the basis of a Fourier transform into individual segments, and the MDCT coefficients sequence obtained by the transform are used to form a table. Then, the application range of the above method 1 can be expanded. Actually, the sum of the vectors of the MDCT coefficients sequence that are stored in the table is employed to represent the basis. FIG. 8 is a diagram showing an example wherein a basis is separated.

First, a waveform (thick line on the left in FIG. 8) is divided into the first N/2 sample and the last N/2 sample for each block. To perform an MDCT for the first N/2 sample, a waveform having a value of 0 is compensated for by the N/2 sample (in the middle in FIG. 8). To perform an MDCT for the last N/2 sample, a wave form having a value of 0 is compensated for by the N/2 sample (on the right in FIG. 8). In this example, the MDCT is performed for the first (last) half of the waveform, and the obtained MDCT coefficients sequence are represented by $V_{fore,r,b,k}$ ($V_{back,r,b,k}$). Since the MDCT possesses linearity, the original MDCT coefficient sequence $V_{r,b,k}$ is equal to the sum of the vectors $V_{fore,r,b,k}$ and $V_{back,r,b,k}$.

When the basis is separated in this manner, $V_{fore,r,b,k}$ and $V_{back,r,b,k}$ can be used in common even for the portion wherein $V_{r,b,k}$ can not be standardized using method 1. For example, in FIG. 5, method 1 can not be applied for Block 1 because b=1. However, if each block is separated into first and last segments, the signs are merely inverted for the MDCT coefficient sequence $V_{back,r,1,k}$ for Block 1 and the MDCT coefficient sequence $V_{back,r,2,k}$ for Block 2. Therefore, one of the MDCT coefficients sequence need not be stored. This can also be applied for $V_{fore,r,2,k}$ for Block 2, and $V_{fore,r,3,k}$, for Block 3. $V_{fore,r,1,k}$, for Block 1, and $V_{fore,r,3,k}$, for Block 3 are always zero vectors.

The processing for generating a table using the above method is as follows.

Step 1: The same as when the basis is not separated into first and second segments.

Step 2: The same as when the basis is not separated into first and second segments.

Step 3: First, the "fore" coefficients are prepared. The (N/2×(b−1))-th to the (N/2×b)-th coefficients are extracted, and the N/2 sample having a value of 0 is added after them.

$$h_{fore,b}(z)=g(z+N/2\times(b-1))\ (0\leq z<N/2)$$

$$0\ (N/2\leq z<N)$$

Step 4: A window function is multiplied.

$$h_{fore,b}(z)=h_{fore,b}(z)\times\mathrm{win}(z)\ (0\leq z<N,\ \mathrm{win}(z)\text{ is a window function})$$

Step 5: The MDCT process is performed, and the obtained N/2 MDCT coefficients are defined as vector $V_{fore,r,b,k}$.

$$V_{fore,r,b,k}=MDCT(h_{fore,b}(z)).$$

Step 6: Next, the "back" coefficients are prepared. The (N/2×b)-th to the (N/2×(b+1))-th coefficients are extracted, and the N/2 sample having a value of 0 is added before them.

$$h_{back,b}(z)=0\ (0\leq z<N/2)$$

$$g(z+N/2\times(b-1))\ (N/2\leq z<N)$$

Step 7: A window function is multiplied.

$$h_{back,b}(z)=h_{back,b}(z)\times\mathrm{win}(z)\ (0\leq z<N,\ \mathrm{win}(z)\text{ is a window function})$$

Step 8: The MDCT process is performed, and the obtained N/2 MDCT coefficients are defined as vector $V_{back,r,b,k}$.

$$V_{back,r,b,k}=MDCT(h_{back,b}(z)).$$

Step 9: $V_{fore,r,b,k}$ and $V_{back,r,b,k}$ are calculated for all the combinations (k,b), and the matrixes $T_{fore,r,b}$ and $T_{back,r,b}$ are formed.

$$T_{fore,r,b}=(V_{fore,r,b,1},\ V_{fore,r,b,2},\ \ldots\ V_{fore,r,b,N/2})$$

$$T_{back,r,b}=(V_{back,r,b,1},\ V_{back,r,b,2},\ \ldots\ V_{back,r,b,N/2})$$

In accordance with the linearity of the MDCT, $$V_{r,b,k}=V_{fore,r,b,k}+V_{back,r,b,k},$$

and $$T_{r,b}=T_{fore,r,b}+T_{back,r,b}.$$

In accordance with this characteristic, for the transform between the MDCT domain and the frequency domain, only an operation equivalent to the operation performed using the $T_{r,b}$ need be performed by using $T_{fore,r,b}$ and $T_{back,r,b}$.

The periodicity of the basis is employed under these definitions, in case a where (k×m)/n is an integer, and under the condition where b+m=n+1, $h_{fore,n+1}(z)==h_{fore,b}(z)$ is established. This is because the second half of $h_{fore,b}(z)$ has a value of 0. Thus, the application range for the following equation is expanded, and $$h_{fore,b+m}(z)==h_{fore,b}(z)\ (\text{limited to a range of } 2\leq b\leq n-m+1).$$

Thus, $$V_{fore,r,b+m,k}==V_{fore,r,b,k}\ (\text{limited to a range of } 2\leq b\leq n-m+1),$$

and the portions used in common are increased. For $V_{back,r,b,k}$, $$h_{back,m+1(z)}==h_{back,l(z)}$$

is established even under the condition where b=1. This is because the first half of 1(z) has a value of zero. The application range for the following equation is expanded, and $$h_{back,b+m}(z)==h_{back,b}(z)\ (\text{limited to a range of } 1\leq b\leq n-m).$$

Therefore, $$V_{back,r,b+m,k}==V_{back,r,b,k}\ (\text{limited to a range of } 1\leq b\leq n-m+1),$$

and the portions used in common are increased. The same range limitation is provided for the cases b, c and d.

Method 3: Approximating Method

The final method for reducing the table involves the use of an approximation. Among the MDCT coefficients sequence that correspond to one basis waveform of a Fourier transform, an MDCT coefficient that is smaller than a specific value can approximate zero, and no actual problem occurs. A threshold value used for the approximation is appropriately selected by a trade off between the transform precision and the memory capacity. When the individual systems are so designed that they do not perform a matrix calculation for the portion that approximates zero, the calculation time can also be reduced.

Furthermore, when all the coefficients, including large coefficients, approximate rational numbers, which are then quantized, the coefficients can be stored as integers, not as floating-point numbers, so that a savings in memory capacity can be realized.

Correlation Table Generator

Information concerning the window is received, and the table is generated and output. As well as the method for generating the correlation table, the information concerning the window includes the frame length N, the length n of a block corresponding to the frame, the offset of the first window, the window function, and "W" for regulating the window length. Basically, the number of tables that are generated is equivalent to the number of window types used in the target sound compression technique.

Additional Information Embedding System

Figure 9:
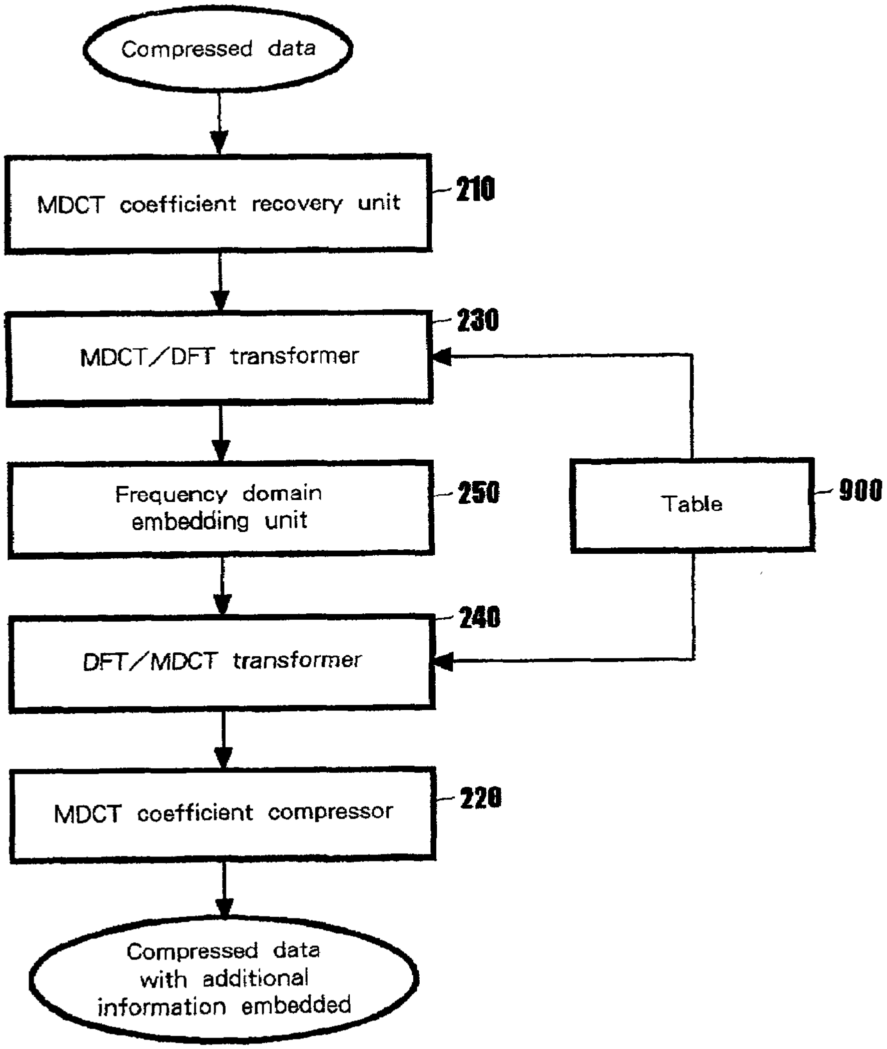
FIG. 9 is a block diagram showing an additional information embedding system according to the present invention.

FIG. 9 is a block diagram illustrating an additional information embedding system according to the present invention. An MDCT coefficient recovery unit 210 recovers sound MDCT coefficients sequence, and window and other information from compressed audio data that are entered. These data are extracted (recovered) using Huffmann decoding, inverse quantization and a prediction method, which are designated in the compressed audio data. An MDCT/DFT transformer 230 receives the sound MDCT coefficients sequence and the window information that are obtained by the MDCT coefficient recovery unit 210, and employs a table 900 to transform these data into a frequency component. A frequency domain embedding unit 250 embeds additional information in the frequency component that is obtained by the MDCT/DFT transformer 230.

In accordance with the window information extracted by the MDCT coefficient recovery unit 210, a DFT/MDCT transformer 240 employs the table 900 to transform, into MDCT coefficients sequence, the resultant frequency components that are obtained by the frequency domain embedding unit 250. Finally, an MDCT coefficient compressor 220 compresses the MDCT coefficients obtained by the DFT/MDCT transformer 240, as well as the window information and the other information that are extracted by the MDCT coefficient recovery unit 210. The compressed audio data are thus obtained. The prediction method, the inverse quantization and the Huffmann decoding, which are designated in the window information and the other information, are employed for the data compression. Through this processing, the additional information is embedded so it corresponds to the operation of the frequency component, and so that even after decompression additional information can be detected using the conventional frequency domain detection method.

Additional Information Detection System

Figure 10:
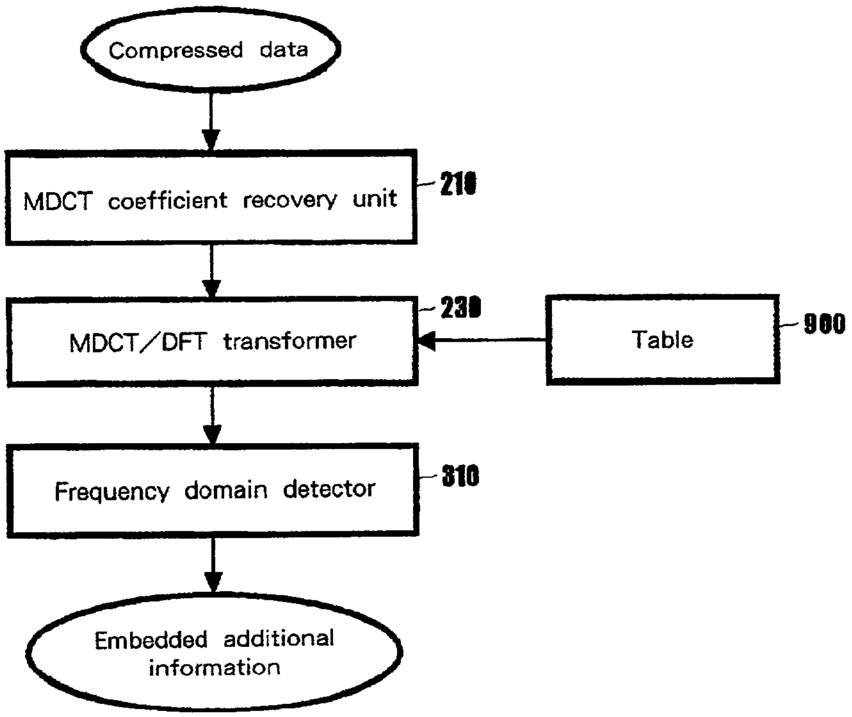
FIG. 10 is a block diagram showing an additional information detection system according to the present invention.

FIG. 10 is a block diagram illustrating an additional information detection system according to the present invention. An MDCT coefficient recovery unit 210 recovers sound MDCT coefficients sequence, window information and other information from compressed audio data that are entered. These data are extracted (recovered) using Huffmann decoding, inverse quantization and a prediction method, which are designated in the compressed audio data. An MDCT/DFT transformer 230 receives the sound MDCT coefficients sequence and the window information that are obtained by the MDCT coefficient recovery unit 210, and employs a table 900 to transform these data into frequency components. Finally, a frequency domain detector 310 detects additional information in the frequency components that are obtained by the MDCT/DFT transformer 230, and outputs the additional information.

Additional Information Updating System

Figure 11:
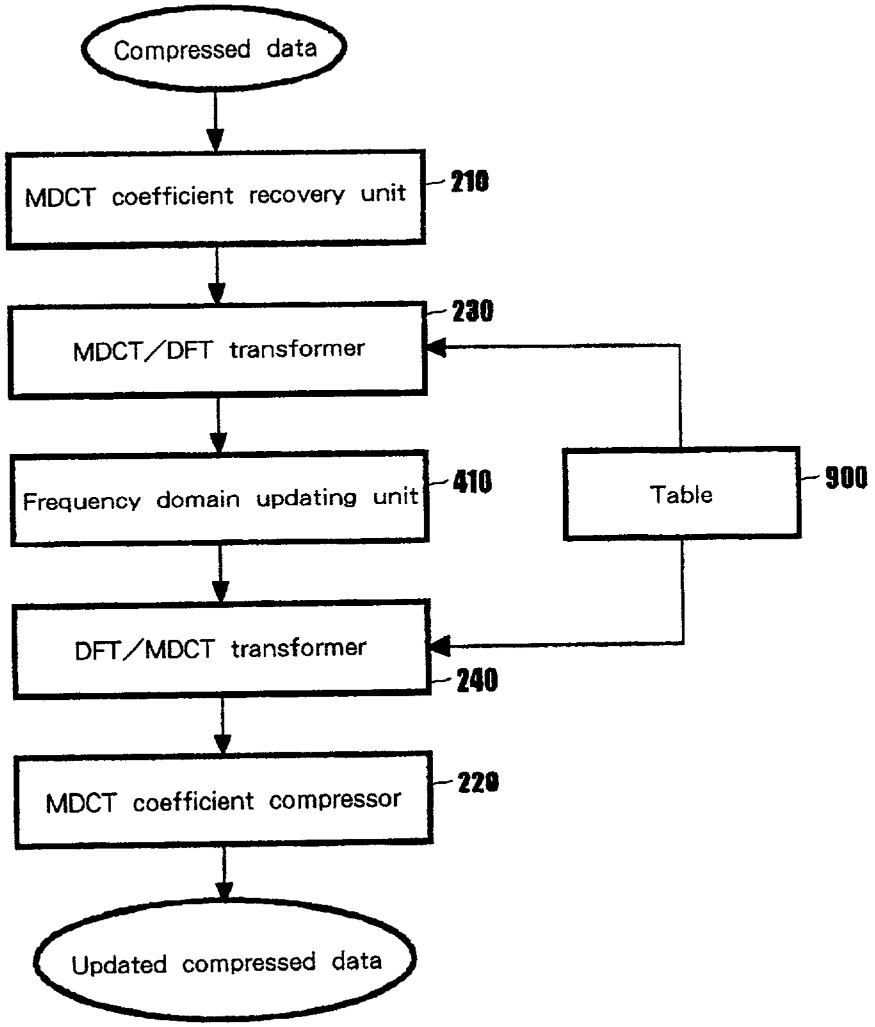
FIG. 11 is a block diagram showing an additional information updating system according to the present invention.

FIG. 11 is a block diagram illustrating an additional information updating system according to the present invention.

An MDCT coefficient recovery unit 210 recovers sound MDCT coefficients sequence, window information and other information from compressed audio data that are entered. These data are extracted (recovered) using Huffmann decoding, inverse quantization and a prediction method, which are designated in the compressed audio data.

An MDCT/DFT transformer 230 receives the sound MDCT coefficients sequence and the window information that are obtained by the MDCT coefficient recovery unit 210, and employs a table 900 to transform these data into frequency components.

A frequency domain updating unit 410 first determines whether additional information is embedded in the frequency components obtained by the MDCT/DFT transformer 230. If additional information is embedded therein, the frequency domain updating unit 410 further determines whether the contents of the additional information should be changed. Only when the contents of the additional information should be changed is the updating of the additional information performed for the frequency components (the determination results may be output so that a user of the updating unit 410 can understand it).

In accordance with the window information extracted by the MDCT coefficient recovery unit 210, a DFT/MDCT transformer 240 employs the table 900 to transform, into MDCT coefficients sequence, the frequency components that have been updated by the frequency domain updating unit 250.

Finally, an MDCT coefficient compressor 220 compresses the MDCT coefficients sequence obtained by the DFT/MDCT transformer 240, as well as the window information and the other information that are extracted by the MDCT coefficient recovery unit 210. The compressed audio data are thus obtained. The prediction method, the inverse quantization and the Huffmann decoding, which are designated in the window and the other information, are employed for the data compression.

General Hardware Arrangement

Figure 12:
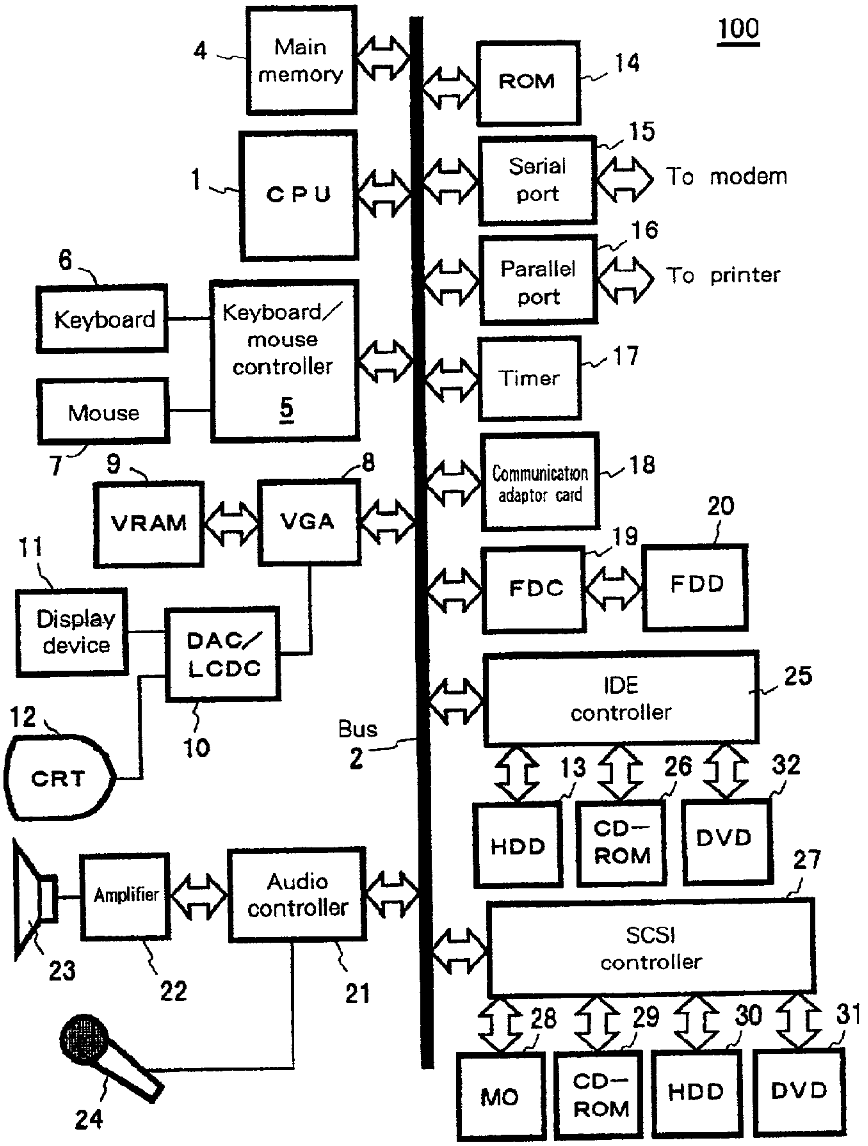
FIG. 12 is a diagram showing the general hardware arrangement of a computer.

The apparatus and the systems according to the present invention can be carried out by using the hardware of a common computer. FIG. 12 is a diagram illustrating the hardware arrangement for a general personal computer. A system 100 comprises a central processing unit (CPU) 1 and a main memory 4. The CPU 1 and the main memory 4 communicate, via a bus 2 and an IDE controller 25, with a hard disk drive (HDD) 13, which is an auxiliary storage device (or a storage medium drive, such as a CD-ROM 26 or a DVD 32). Similarly, the CPU 1 and the main memory 4 communicate, via a bus 2 and a SCSI controller 27, with a hard disk drive 30, which is an auxiliary storage device (or a storage medium drive, such as an MO 29, a CD-ROM 29 or a DVD 31). A floppy disk drive (FDD) 20 (or an MO or a CD-ROM drive) is connected to the bus 2 via a floppy disk controller (FDC) 19.

A floppy disk is inserted into the floppy disk drive 20. Stored on the floppy disk and the hard disk drive 13 (or the CD-ROM 26 or the DVD 32) are a computer program, a web browser, the code for an operating system and other data supplied in order that instructions can be issued to the CPU 1, in cooperation with the operating system and in order to implement the present invention. These programs, code and data are loaded into the main memory 4 for execution. The computer program code can be compressed, or it can be divided into a plurality of codes and recorded using a plurality of media. The programs can also be stored on another a storage medium, such as a disk, and the disk can be driven by another computer.

The system 100 further includes user interface hardware. User interface hardware components are, for example, a pointing device (a mouse, a joy stick, etc.) 7 or a keyboard 6 for inputting data, and a display (CRT) 12. A printer, via a parallel port 16, and a modem, via a serial port 15, can be connected to the communication terminal 100, so that it can communicate with another computer via the serial port 15 and the modem, or via a communication adaptor 18 (an ethernet or a token ring card). A remote transceiver may be connected to the serial port 15 or the parallel port 16 to exchange data using ultraviolet rays or radio.

A loudspeaker 23 receives, through an amplifier 22, sounds and tone signals that are obtained through D/A (digital-analog) conversion performed by an audio controller 21, and releases them as sound or speech. The audio controller 21 performs A/D (analog/digital) conversion for sound information received via a microphone 24, and transmits the external sound information to the system. The sound may be input at the microphone 24, and the compressed data produced by this invention may be generated based on the sound that is input.

It would therefore be easily understood that the present invention can be provided by employing an ordinary personal computer (PC), a work station, a notebook PC, a palmtop PC, a network computer, various types of electric home appliances, such as a computer-incorporating television, a game machine that includes a communication function, a telephone, a facsimile machine, a portable telephone, a PHS, a PDA, another communication terminal, or a combination of these apparatuses. The above described components, however, are merely examples, and not all of them are required for the present invention.

Advantages of the Invention

According to the present invention, provided is a method and a system for embedding, detecting or updating additional information embedded in compressed audio data, without having to decompress the audio data. Further, according to the method of the invention, the additional information embedded in the compressed audio data can be detected using a conventional watermarking technique, even when the audio data have been decompressed.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

$$M_k = \sum_{n=0}^{N-1} X_n \cos\left\{\frac{2\pi}{N}\left(n+\frac{N}{4}+\frac{1}{2}\right)\left(k+\frac{1}{2}\right)\right\}$$ [Equation 1]

-continued $$R_k = \sum_{0}^{N-1} X_n \cos\left\{\frac{2\pi}{N}kn\right\}$$ [Equation 2]

$$I_k = -\sum_{0}^{N-1} X_n \sin\left\{\frac{2\pi}{N}kn\right\}$$

$$R = \sum_{b=1}^{n+1} T_{r,b}^T M_b$$ [Equation 3]

$$I = \sum_{b=1}^{n+1} T_{i,b}^T M_b$$

$$R = \sum_{b=1}^{n+1} T_{W,r,b}^T M_b$$ [Equation 4]

$$I = \sum_{b=1}^{n+1} T_{W,r,b}^T M_b$$

$$\begin{aligned} M_b &= T_{r,b}R + T_{i,b}I \\ &= \sum_{k=1}^{N/2} (R_k V_{r,b,k} + I_k V_{i,b,k}) \end{aligned}$$ [Equation 5]

$$\begin{aligned} R_k &= V_{r,b,k} \cdot M_b \\ I_k &= V_{i,b,k} \cdot M_b \end{aligned}$$ [Equation 6]

$$\begin{aligned} &[a]\ u_{r,b+m,k} = u_{r,b,k} \\ &[b]\ u_{r,b+m,k} = -u_{r,b,k} \\ &[c]\ u_{r,b+m,k} = -u_{i,b,k} \\ &[d]\ u_{r,b+m,k} = u_{i,b,k} \end{aligned}$$ [Equation 7]

What is claimed is:

1. A system for embedding additional information in compressed audio data comprising:

(1) means for extracting MDCT coefficients from said compressed audio data;

(2) means for employing said MDCT coefficients to calculate a frequency component for said compressed audio data;

(3) means for embedding additional information in said frequency component obtained in a frequency domain;

(4) means for transforming into MDCT coefficients said frequency component in which said additional information is embedded; and (5) means for using said MDCT coefficients, in which said additional information is embedded, to generate compressed audio data.

2. The system according to claim 1, wherein said means (2) calculates said frequency component for said compressed audio data using a precomputed table in which a correlation between MDCT coefficients and frequency components is included.

3. The system according to claim 1, wherein said means (4) transforms said frequency component into said MDCT coefficients by using a precomputed table that includes a correlation between MDCT coefficients and frequency components.

4. The system according to claim 1, wherein said means (3) for embedding said additional information in said frequency domain divides an area for embedding one bit by the time domain, and calculates a signal level for each of the individual obtained area segments, while embedding said additional information in said frequency domains in accordance wit the lowest signal level available for each frequency.

5. A system for updating additional information embedded in compressed audio data comprising:

(1) means for extracting MDCT coefficients from said compressed audio data;

(2) means for employing said MDCT coefficients to calculate a frequency component for said compressed audio data;

(3) means for detecting said additional information in said frequency component that is obtained;

(3-1) means for changing, as needed, said additional information for said frequency component;

(4) means for transforming into MDCT coefficients said frequency component in which said additional information is embedded; and (5) means for using said MDCT coefficients, in which said additional information is embedded, to generate compressed audio data.

6. For at least one window function and one window length employed for compressing audio data, a method for generating a table including a correlation between MDCT coefficients and frequency components comprising the steps of:

(1) generating a basis which is used for performing a Fourier transform for a waveform along a time axis;

(2) multiplying a window function by a corresponding waveform that is generated by using said basis;

(3) performing an MDCT process, for the result obtained by the multiplication of said window function, and calculating an MDCT coefficient; and (4) correlating said basis and said MDCT coefficient.

7. The table generation method according to claim 6, wherein, at said step (2) for multiplying said corresponding window function, a periodicity of said basis is employed to prevent generation of a redundant correlation between a frequency component and an MDCT coefficient.

8. The table generation method according to claim 6, wherein, at said step (2) for multiplying said corresponding window function, said basis is divided into several segments, and corresponding window functions are multiplied for several of said segments, so that a redundant correlation between a frequency component and an MDCT coefficient is not generated.

9. A computer-readable program storage medium on which a program is stored for executing the table generation method in accordance with claim 6.

10. A method for embedding additional information in compressed audio data comprising the steps of:

(1) extracting MDCT coefficients from said compressed audio data;

(2) employing said MDCT coefficients to calculate a frequency component for said compressed audio data;

(3) embedding additional information in said frequency component obtained in a frequency domain;

(4) transforming into MDCT coefficients said frequency component in which said additional information is embedded; and (5) using said MDCT coefficients, in which said additional information is embedded, to generate compressed audio data.

11. The method according to claim 10, wherein, at said step (2), said frequency component is calculated for said compressed audio data using a precomputed table in which a correlation between MDCT coefficients and frequency components is included.

12. The method according to claim 10, wherein, at said step (4), said frequency component is transformed into said MDCT coefficients by using a precomputed table that includes a correlation between MDCT coefficients and frequency components.

13. A computer-readable program storage medium on which a program is stored for executing the additional information embedding method according to claim 10.

14. A method for updating additional information embedded in compressed audio data comprising the steps of:

(1) extracting MDCT coefficients from said compressed audio data;

(2) employing said MDCT coefficients to calculate a frequency component for said compressed audio data;

(3) detecting said additional information in said frequency component that is obtained;

(3-1) changing, as needed, said additional information for said frequency component;

(4) transforming into MDCT coefficients said frequency component in which said additional information is embedded; and (5) using said MDCT coefficients, in which said additional information is embedded, to generate compressed audio data.

15. A computer-readable program storage medium on which a program is stored for executing the additional information updating method according to claim 14.

16. An electronic watermarking apparatus comprising:

an information embedding device for embedding additional information in compressed audio data; and a detection device for detecting said additional information from said compressed audio data, said information embedding apparatus including, (1) means for extracting MDCT coefficients from said compressed audio data, (2) means for employing said MDCT coefficients to calculate a frequency component for said compressed audio data, (3) means for embedding additional information in said frequency component obtained in a frequency domain, (4) means for transforming into MDCT coefficients said frequency component in which said additional information is embedded, and (5) means for using said MDCT coefficients, in which said additional information is embedded, to generate compressed audio data, and said detection device including (1) means for extracting MDCT coefficients from said compressed audio data, (2) means for employing said MDCT coefficients to calculate a frequency component for said compressed audio data, and (3) means for detecting said additional information in said frequency component that is obtained.

17. A method for embedding additional information in compressed audio data comprising the steps of:

generating a table having a correlation between Modified Discrete Cosine Transform (MDCT) coefficients and frequency components, wherein each frequency component represents a basis of a Fourier transformation relative to an MDCT coefficient in accordance with a frame length;

extracting compressed MDCT coefficients from the compressed audio data;

obtaining a frequency component of the compressed audio data using the extracted MDCT coefficients and the generated table;

embedding additional information into the frequency component obtained in a frequency domain to calculate an embedded frequency signal;

transforming the embedded frequency signal into an MDCT coefficient using the generated table;

adding the MDCT coefficient to the MDCT coefficients of the audio data to define new MDCT coefficients at the audio data; and compressing the new MDCT coefficients for the compressed audio data, resulting in watermarked digital audio data.

* * * * *

UNITED STATES PATENT AND TRADEMARK OFFICE

CERTIFICATE OF CORRECTION

PATENT NO. : 6,985,590 B2 Page 1 of 1
DATED : January 10, 2006
INVENTOR(S) : R. Tachibana et al.

It is certified that error appears in the above-identified patent and that said Letters Patent is hereby corrected as shown below:

Column 11,
Line 67, change "$V_{l,b,k}$" to -- $V_{i,b,k}$ --.

Column 12,
Line 16, change "$V_{l,b,k}$" to -- $V_{i,b,k}$ --.

Signed and Sealed this

Twenty-eighth Day of March, 2006

JON W. DUDAS
*Director of the United States Patent and Trademark Office*